Sept. 26, 1944.   M. M. CUNNINGHAM   2,358,962
MOLDED ARTICLE AND METHOD FOR MAKING SAME
Filed Jan. 29, 1940   2 Sheets-Sheet 1
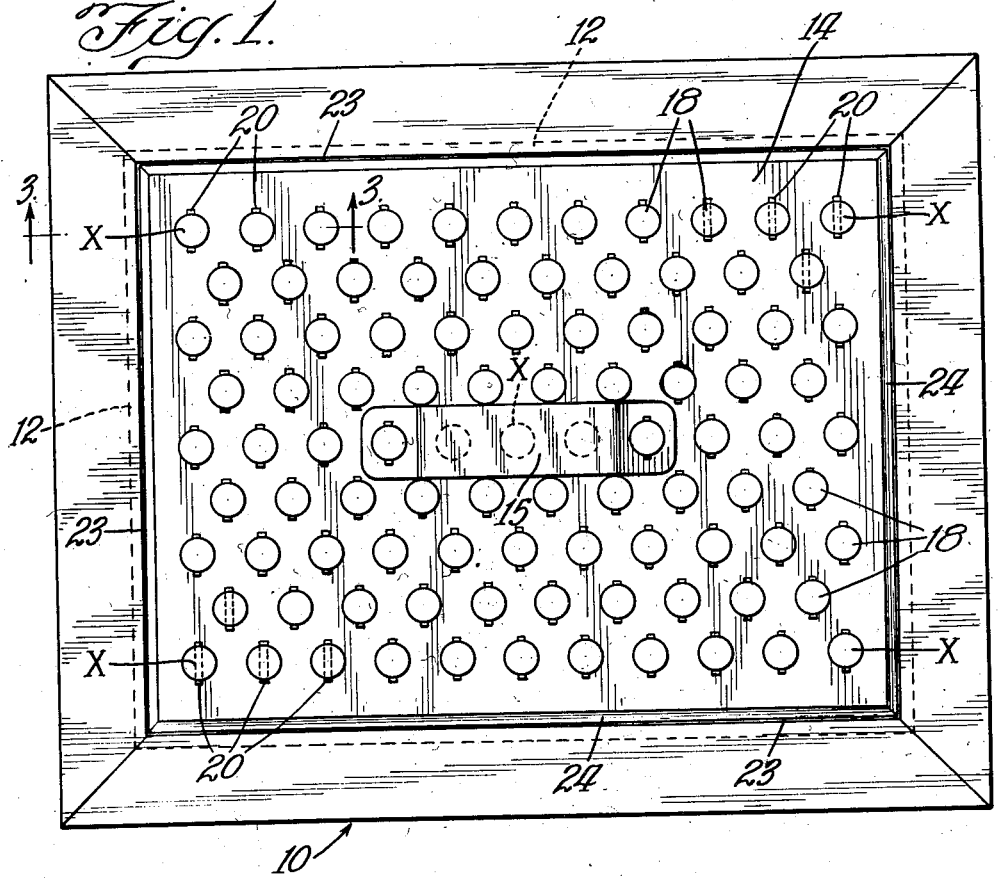
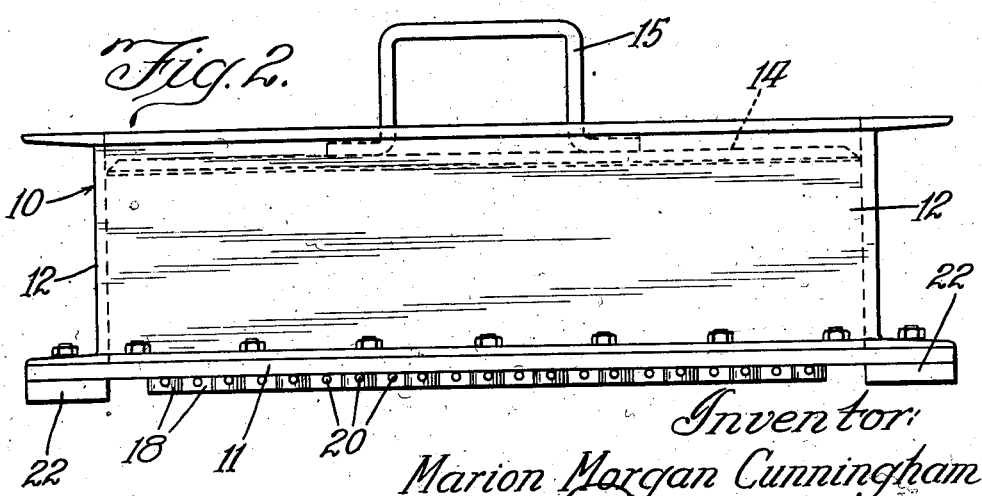
Inventor:
Marion Morgan Cunningham
By Eugene M. Giles Atty.

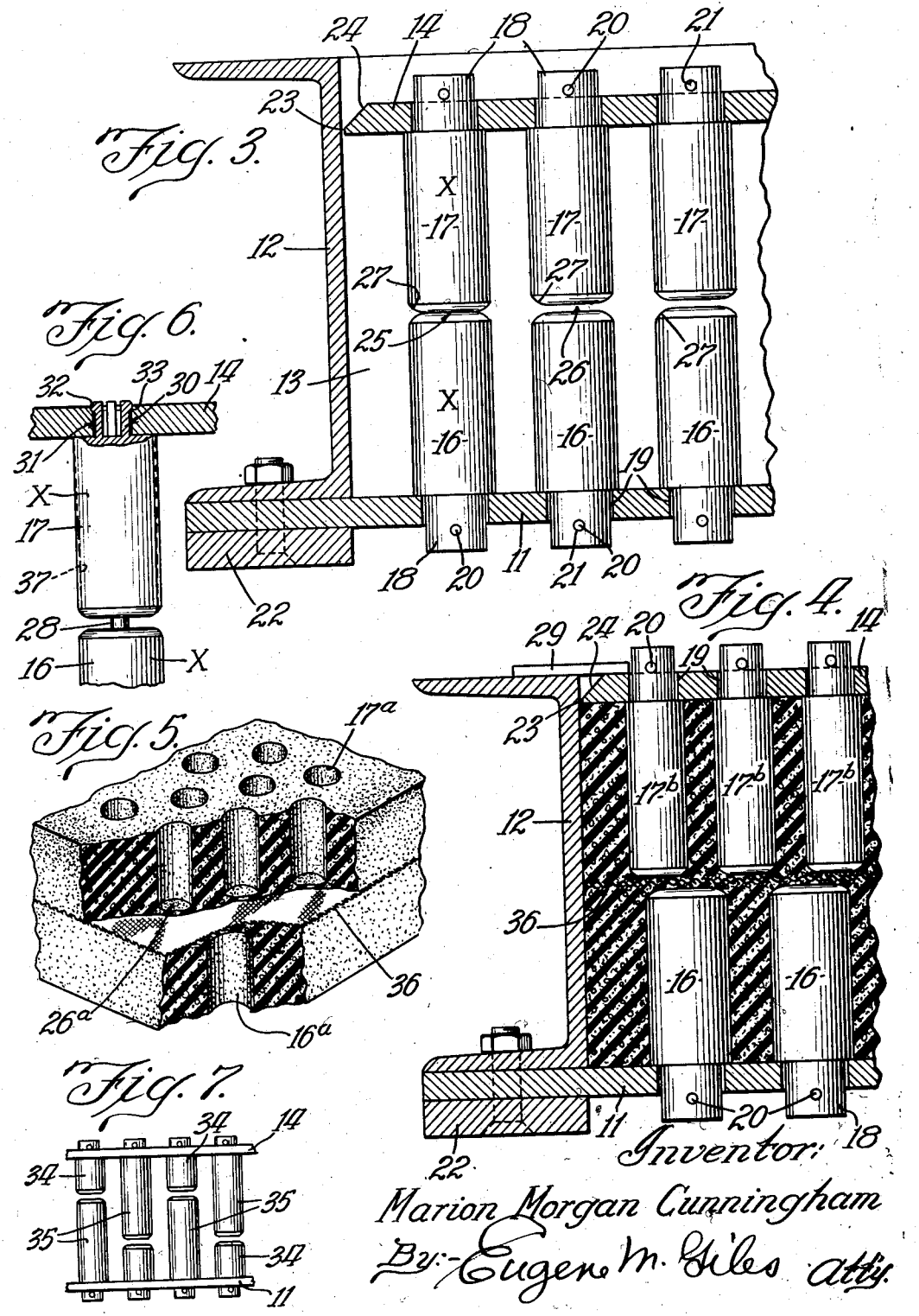

Patented Sept. 26, 1944

2,358,962

UNITED STATES PATENT OFFICE 2,358,962

MOLDED ARTICLE AND METHOD FOR MAKING SAME

Marion Morgan Cunningham, South Bend, Ind., assignor to Mishawaka Rubber and Woolen Manufacturing Company, Mishawaka, Ind., a corporation of Indiana Application January 29, 1940, Serial No. 316,115

8 Claims. (Cl. 18—53)

My invention relates to the molding of spongy rubber cushions or the like wherein numerous cored openings are provided which extend through or substantially through the cushion and has reference more particularly to the molding of such articles with opposed separable core sections so that the parting place of the cores is within the molded article.

In making certain articles, for example mattresses, of latex foam or similar material it is desirable to mold the article with numerous cored openings extending through or substantially through the article from top to bottom, this having been accomplished heretofore by providing the mold with cores which extend through the mold cavity from one wall thereof to the opposed wall of the cavity, the cores usually being attached to one of these walls and of a suitable length to extend close to or abut against the opposed wall when the mold is closed.

This previous practice, however, has a number of disadvantages, for example, in fairly thick cushions or mattresses the length of cores required presents considerable difficulty and sometimes causes mutilation of the article in stripping the long cores therefrom. Also with the cores attached at one end and extending through the cavity the communication of vulcanizing heat to the interior of the molded mass is principally from the attached ends of the cores with the result that vulcanization is not as uniform or rapid as desired. Moreover, the side of the mold carrying the cores is excessively heavy and cumbersome to handle and it is impossible to make both sides of the cushion alike with clean cut openings therein, as preferred in many cases, since a thin film or unsightly ragged edges are usually formed between the outer ends of the cores and the opposed mold wall toward or against which the cores project.

The principal objects of my invention are to provide an improved molding method by which the above mentioned disadvantages of present practice are overcome; to permit reinforcement of the cushion as well as differential size and arrangement of the cored openings at opposite sides of the cushion; and in general to simplify the molding and facilitate the vulcanization and stripping of spongy rubber like cushions or mattresses and improve the product, these and other objects being accomplished as pointed out hereinafter and as shown in the accompanying drawings in which:

Fig. 1 is a plan view of a mold constructed in accordance with the present invention;

Fig. 2 is a side elevational view of the mold shown in Fig. 1;

Fig. 3 is a fragmentary sectional view taken on the line 3—3 of Fig. 1;

Fig. 4 is a view similar to Figure 3 taken through a filled mold which has a modified form of cover support;

Fig. 5 is a fragmentary sectional view of an article formed within the mold shown in Fig. 4;

Fig. 6 is a detail view of a modified core structure; and

Fig. 7 is a fragmentary view showing a modified core arrangement.

Referring to the drawings in which I have, for the purpose of illustration, shown a preferred embodiment of the invention with several modifications thereof, the reference numeral 10 indicates the mold as a whole which consists of a cavitied member composed of a bottom wall 11 with a surrounding side wall 12 forming a cavity 13 which is closed by a removable cover 14 which for convenience in handling is preferably provided with a handle 15.

The bottom wall 11 has a large number of cores 16 arranged at spaced intervals throughout the area thereof and extending upwardly therefrom substantially half way to the cover 14 and the latter has corresponding cores 17 extending downwardly therefrom so that the cores, instead of being of a length to extend from top to bottom of the mold cavity as heretofore are of half length with their parting substantially at the middle of the mold cavity 13 or midway between the bottom wall 11 and the top wall or cover 14.

The cores 16 and 17 may be attached to their respective walls 11 and 14 in any convenient manner, as for example by forming the cores at their outer ends with reduced shanks 18 which engage through apertures 19 in the walls 11 and 14 and are held in place by retaining members 20 passed through transverse openings 21 in the reduced shanks 18 and engaging against the outer face of respective wall 11 or 14. Each half core 16 and 17 may have an individual retaining member 20 or these retaining members 20 may be of suitable length to extend, for example, across the bottom or top of the mold and laced through the transverse openings of a row of cores 16 or 17. Since the shanks of the lower half cores 16 project through the bottom wall 11 it is preferable to provide supports such as cleats 22 under the ends of the bottom wall to hold the latter at a suitable elevation to provide clearance for the projecting ends of these shanks.

In molding cushions or mattresses of foam rubber or the like it is desirable to employ a sufficient quantity of the foam rubber composition to insure complete filling of the mold cavity and as it is impractical to measure the quantity with absolute precision there is usually a slight excess. On this account and also to accommodate any increase of volume due to expansion upon initial application of heat, it is preferred to use a cover 14 which telescopes within the upper end of the mold cavity, as shown, with sufficient clearance between the margin of the cover and the side walls 12 of the mold to leave a narrow extrusion space 23 through which the surplus foam rubber composition may extrude when the cover is in place and it is also preferred to bevel the marginal edges of the cover as indicated at 24 to provide a narrow tear line along which the extruded composition, after vulcanization, can readily be cut or torn from the molded cushion.

Moreover, it is important, for complete filling of the mold to avoid pocketing of air or gas in the mold and this extrusion space 23 contributes to this end. In addition to this extrusion space it is desirable to have other air or gas escapement outlets throughout the area of the cover 14 and this is accomplished in the illustrated structure by constructing the core outer ends and shanks 18 so that they fit sufficiently loosely against the cover 14 and within the openings 19 thereof to permit air escapement at the outer ends of the cores 17, the spacing being such, however, that while air and gas is permitted to escape at the outer ends of the cores 17, it is insufficient to permit escapement of the foam rubber composition at these places. Thus the same mounting of the cores may be employed for the bottom wall 11 of the mold and the cores 16 and 17 accordingly may be interchangeable.

The cover 14 may be supported at the proper elevation in the mold cavity in any desired manner, for example, by merely permitting the lower ends of the cores 17 to abut against the upper ends of the cores 16. However, it has been found that, since the foam rubber composition is necessarily poured in the mold before the cover is placed in position, foam rubber becomes trapped and crushed between the ends of the half cores and forms on the finished product a dense film which is undesirable as it interferes with air circulation between the cored out openings at opposite sides thereof.

Therefore it is preferred to avoid or minimize contact between the core ends and to this end a few of the cores 16 or 17 or both may be made sufficiently long, for example the four corner sets of cores and the center core, which are marked for identification by the letter X, so that they abut as shown at 25, in Fig. 3, whereas all the other cores 16 and 17 are of a shorter length so that their inner ends are held in spaced relation, as indicated at 26 in Fig. 3 by the five sets of abutting cores marked X.

Moreover the edges of the inner ends of the cores 16 and 17 are preferably rounded as indicated at 27 as it has been found that this affords easier escapement of the foam rubber composition from between the core ends when the cover is placed in position and prevents collapse of the rubber foam between the core ends, it being desirable to avoid such collapse in order that the film between the core ends in the finished article will be of the same texture and porosity as in the remainder of the cushion and permit free air circulation therethrough.

Instead of employing longer cores at the few selected locations X for holding the ends of the other cores 16 and 17 in spaced relation, the selected cores X may be of the same length as the other cores and one of the cores of each selected pair may have at its inner end a small reduced extension or short pin like projection like that shown at 28 on the core 16 of Fig. 6 to engage the end face of the opposed core 17 for holding the other cores 16 and 17 in the desired spaced relation.

Also the core abutting arrangement for locating the cover 14 at the proper elevation may be entirely dispensed with and the cover 14 may have at suitable intervals therearound outwardly extending straps 29 to rest on the upper edge of the mold side walls 12 as shown in Fig. 4 so as to hold the cover 14 at the proper elevation with the lower ends of all the cores 17 spaced as at 26 from all of the lower cores 16.

Moreover, instead of employing the shanks 18 and retaining members 20 for securing the cores 16 and 17 to their respective walls 11 and 14, the cores may have a split extension such as shown at 30 in Fig. 6 which has a sort of snap fastener engagement in the opening 31 of the respective wall 11 or 14, preferably with an annular bead 32 at the outer end which engages an annular seat 33 around the outer end of the opening 31 to insure retention of the extension 30 in opening. In this construction, as in that previously described, provision is made to permit air escapement without permitting foam rubber composition to escape through the opening 31.

In using the above described mold, the cover 14 having been removed, a quantity of foam rubber composition sufficient to insure complete filling of the mold space when the cover and its cores are placed in position, is poured in the mold cavity 13 and this of course, fills the mold to a level above the upper ends of the lower cores 16 but below the place where the cover is to be located. The cover 14 with its depending cores 17 is then placed in position within the upper end of the mold cavity 13 and as the cores 17 engage in and displace the rubber composition, the level of the composition is raised until it completely fills the mold and contacts the underside of the cover 14 throughout the area thereof and without any entrapment of air since it is free to escape between the shanks 18 and cover openings 19 and through the space 23 around the margin of the cover.

The cover 14, of course, is held at the proper elevation by the endwise engagement of the few selected cores 16 and 17 identified by the letter X or the projections 28 thereof (see Fig. 6) or by the straps 29 of Fig. 4 so that the ends of most or all the other cores 16 and 17 are spaced apart, and as the cover is placed in position and the lower ends of the cores 17 submerged in the foam rubber composition the curved edges 27 of the separated cores 16 and 17 permit easy outflow of the composition from therebetween and the spacing 26 prevents compression of the compound therebetween and collapse of the foam and accordingly leaves between the ends of the separated cores 16 and 17 a thin layer of compound of the same foamy consistency as that throughout the rest of the mold cavity.

After the mold is prepared with the latex foam compound as aforesaid, the compound is permitted to set or jel after which the mold is placed in a vulcanizer and subjected to heat at proper temperatures for sufficient length of time to vulcanize the compound and in this vulcanizing operation heat is communicated from the outer ends of both sets of cores 16 and 17 into the interior of the molded mass, thereby affording more rapid and uniform internal application of heat than with long cores extending through the mass only from one side. After vulcanization, the cover 14 is removed, thereby stripping the upper cores from the vulcanized compound, after which the molded and vulcanized cushion is removed from the mold and at the same time stripped from the lower cores 16, and the extruded rubber around the margin of the cover 14 is of course, removed, which is preferably done before or by the operation of lifting the cover from the mold, and the resultant cushion is of mold shape with adjoining openings 16ª throughout the area thereof at one side and similar openings 17ª throughout the area of the other side opposed to and separated at the center of the cushion from the openings 16ª by a thin webbing 26ª of the vulcanized foam rubber as shown in Fig. 5. It will be noted that the openings 16ª and 17ª are of tubular form, although not necessarily cylindrical as will be readily appreciated, the openings comprising cavities surrounded by an unbroken wall to the end that the cushion itself is a coherent unitary mass punctured by the numerous cavities which, however, due to their non-communicating arrangement, do not seriously impair the relative firmness of the cushion as a whole or create any substantial tendency toward collapse or side sway in the body of the material.

Thus it will be understood that the stripping of the cores from the molded article is greatly facilitated as the cores are only of half the length heretofore employed and danger of mutilating or tearing the molded article is thus greatly minimized. Also the mold may be handled much more easily than previous molds inasmuch as the weight of the cores is distributed between the cover and cavitied section of the mold instead of being carried entirely by one or the other as heretofore.

Furthermore the molded cushion is exactly alike at both sides with clean cut openings extending therein without exposed objectionable membranes or unsightly ragged edges at the ends of the openings at one side of the cushion, and furthermore by molding the cushion with opposed half section cores any desired thickness of webbing may be provided between the core ends at the center of the cushion where it is appropriate and useful for reinforcing.

The cores may, if desired, be slightly tapered as indicated by dotted lines at 37 to facilitate stripping and moreover cores of different diameter may be employed respectively at the top and bottom, as for example as shown in Fig. 4 in which the upper cores 17ᵇ are of less diameter and more numerous than the lower cores 16, so that one side of the cushion or mattress has different cushioning properties than the other side. Moreover cores of different lengths may be employed, that is the upper cores, for example may be shorter than the lower cores or each set of cores, namely the upper set and the lower set may include cores of different lengths, for example as shown somewhat diagrammatically in Fig. 7 wherein both the cover 14 and mold bottom wall 11 have short cores 34 between long cores 35 and arranged so that the long cores 35 of both sets are opposite the short cores 34 of the other set, thereby forming reinforcing webs at several different elevations in the cushion body.

In addition to its above mentioned advantages of ease of stripping, weight distribution and uniform clean cut openings at opposite sides of the cushion or mattress, the present invention affords the further advantage that it permits incorporation in the molded unit of a web of reinforcing material which may be arranged centrally, for example, between the top and bottom of the cushion. To accomplish this it is merely necessary to place a sheet of reinforcing material on the upper ends of the lower cores 16, for example as indicated at 36 in Fig. 4 so that in the filled mold it will be held by the upper and lower core ends in the central position.

The reinforcing 36 may be of any suitable material, preferably a coarse open mesh fabric and the mold may be filled up to the level of the upper ends of the cores 16 and have the reinforcing 36 then placed in position after which the mold is further filled, or if the fabric is of a sufficiently open mesh it may be placed in position and the entire charge of composition thereafter poured into the mold, or it may be placed on top of the composition in the filled mold and pushed down through the composition to the central position by the upper cores 17 when the cover 14 is placed in position and this fabric, in the subsequent vulcanization of the composition is firmly combined therewith and becomes substantially a permanent unitary part of the cushion.

Moreover this divided core molding arrangement may be conveniently employed for incorporating an electrical heater in the cushion by forming the resistance so that it can be applied in somewhat the same manner as the reinforcing 36 between the opposed ends of the separated cores so that it constitutes a unitary part of the cushion.

Wherever in the specification and claims the term "cored openings" is used the same is intended to mean openings or cavities provided in a molded body by coring elements around which the material is shaped in the molding process.

While I have shown and described my invention in a preferred form, I am aware that various changes and modifications may be made therein without departing from the principles of my invention, the scope of which is to be determined by the appended claims.

I claim as my invention:

1. The method of making a reinforced compressible cushion of spongy rubber like material which comprises interposing a layer of reinforcing material between separated ends of opposed sets of cores in a mold cavity in which the cushion making material is shaped in the cushion form, vulcanizing the cushion making material to the reinforcing material while in the mold to combine the reinforcing material and cushion making material into a cushion unit, and withdrawing the opposed sets of cores from opposite sides of the cushion.

2. A cushion of the class described, comprising a relatively flat body of compressible spongy rubber like material, said body having throughout the area thereof opposed sets of separate and independent cored tubular openings extending inwardly from the opposite sides respectively of the body and separated in noncommunicating fashion at their inner ends by a substantially imperforate webbing of the spongy rubber like material, said webbing being integral with the body of the material.

3. A cushion of the class described, comprising a relatively flat body of compressible spongy rubber like material, said body having throughout the area thereof opposed sets of cored tubular openings extending inwardly from the opposite sides respectively of the body and separated at their inner ends by a webbing of the spongy rubber-like material, said webbing having a sheet of reinforcing material incorporated therein as a permanent substantially unitary part thereof.

4. A cushion of the class described, comprising a relatively flat body of compressible spongy rubber-like material, said body having substantially parallel separate and independent cored tubular openings extending thereinto from opposite sides thereof, said openings terminating interiorly of the body and the inner ends of the oppositely directed openings being closed and separated by a substantially imperforate webbing of the spongy rubber-like material, said webbing being integral with the body of the material.

5. A cushion of the class described, comprising a relatively flat body of compressible spongy rubber-like material, said body having a set of substantially parallel separate and independent cored tubular openings extending thereinto from each side thereof, the openings of each set terminating interiorly of the body and being of substantially uniform length and a substantially imperforate webbing of the spongy rubber-like material forming an integral part of said body and closing and separating the inner ends of said sets of openings.

6. A cushion of the class described, comprising a relatively flat body of compressible spongy rubber-like material, said body having a set of substantially parallel cored openings extending thereinto from each side thereof, the openings of each set terminating interiorly of the body and being of substantially uniform length, a webbing of the spongy rubber-like material forming an integral part of said body and separating the inner ends of said sets of openings, and a sheet of reinforcing material incorporated within said webbing and forming a permanent substantially unitary part thereof.

7. A cushion of the class described comprising a relatively flat body of vulcanized compressible spongy rubber-like material, said body having opposed sets of cored tubular openings extending thereinto from the opposite sides thereof and separated at their inner ends by a webbing of the spongy rubber-like material which is integral with the body, and a sheet of reinforcing material incorporated within said webbing, said webbing being vulcanized to said reinforcing material so that the latter forms a permanent substantially unitary part of the webbing.

8. The method of making a cushion of foam sponge rubber or the like which comprises, providing an upright mold having coring elements extending upward from the bottom thereof, introducing into the mold foam sponge rubber compound predetermined as to quantity so as not to substantially overflow the mold when additional coring elements are inserted into the compound from above, placing over the contents of the mold a cover having downwardly depending coring elements so that said coring elements enter the compound and cause the same to fill the mold substantially to said cover, maintaining the upwardly and downwardly directed coring elements respectively disengaged, vulcanizing the compound while thus confined in the mold, and thereafter removing the respective sets of coring elements from opposite sides of the cushion.

MARION MORGAN CUNNINGHAM.